United States Patent

Nishimoto

[15] 3,705,388

[45] Dec. 5, 1972

[54] MEMORY CONTROL SYSTEM WHICH ENABLES ACCESS REQUESTS DURING BLOCK TRANSFER

[72] Inventor: Tetsunori Nishimoto, Hatano, Japan

[73] Assignee: Kogyo Gijutsuin, Tokyo, Japan

[22] Filed: Aug. 6, 1970

[21] Appl. No.: 61,698

[30] Foreign Application Priority Data

Aug. 12, 1969 Japan ....................44/63296

[52] U.S. Cl. ....................340/172.5

[51] Int. Cl. ....................G06f 13/00

[58] Field of Search ....................340/172.5

[56] References Cited

UNITED STATES PATENTS

| | | | |
|---|---|---|---|
| 3,248,708 | 4/1966 | Haynes | 340/172.5 |
| 3,259,886 | 7/1966 | Singer et al. | 340/172.5 |
| 3,466,613 | 9/1969 | Schlaeppi | 340/172.5 |
| 3,491,339 | 1/1970 | Schramel et al. | 340/172.5 |
| 3,525,985 | 8/1970 | Melliar-Smith | 340/172.5 |

*Primary Examiner*—Paul J. Henon

*Assistant Examiner*—Melvin B. Chapnick

*Attorney*—William D. Hall, Elliott I. Pollock, Fred C. Philpitt, George Vande Sande, Charles F. Steininger and Robert R. Priddy

[57] ABSTRACT

A buffer memory control system for a buffer memory having a shorter access time and a smaller number of memory locations than a main memory. If the requested information is not present in the buffer memory, the block including the requested information is transferred from the main memory to the buffer memory. When a read or write request for the information of another block which is different from the said block is made during the transfer of the latter block, the transfer of the block is interrupted temporarily to immediately effect the reading from or writing in the another block of the buffer memory, after the completion of which the transfer of the block is resumed if the requested information of the another block is present in the buffer memory.

3 Claims, 5 Drawing Figures

INVENTOR

T. NISHIMOTO

BY Hall, Pollock & Vande Sande

ATTORNEY

INVENTOR

T. NISHIMOTO

BY Hall, Pollock & Vande Sande

ATTORNEY

MEMORY CONTROL SYSTEM WHICH ENABLES ACCESS REQUESTS DURING BLOCK TRANSFER

BACKGROUND OF THE INVENTION

1. Field of the Invention

The present invention relates to an information processing system and more particularly relates to a control system for a buffer memory in the information processing system.

2. Description of the Prior Art

Information processing speed of an information processing system has been progressively improved by the development of processing technology and circuit elements. However, such an improvement in the speed of data processing has not yet generally been sufficient for large capacity memories.

In a computer for high speed information processing, many information words often flow into an arithmetic processor during a data processing operations and are simultaneously processed by processing units operating independently of one another in the arithmetic processor. An input/output units require access to a main memory independently of one another.

While the input/output units merely attain access to the main memory for supplying information thereto or for deriving information therefrom, the arithmetic processor often obtains repetitive access to the same data or instruction stored in the main memory during a predetermined processing operation or during successive operations of the same processing format.

Therefore, the main memory of a large scale data processing system frequently receives many access requests.

The operating speed of the information processing system is unduly decreased resulting from the case that these access requests addressed to the main memory are not immediately accepted. Especially, in the case of referring to the same data or instructions repetitively, the processing time is decreased.

In order to improve such a decrease of the processing time of the main memory, a buffer memory has sometimes been employed in the processing system. The buffer memory operates in such a manner as follows. In a read-out operation, when the arithmetic processor obtains access to the main memory, the information referred to by the arithmetic processor or the information located at a group of memory locations including the address storing the referred to information is stored in a buffer memory having a high speed access capability and therefore the information can be immediately read out from the buffer memory without access to the main memory when operation, the same information is referred to again. In a write-in operation, the information to be stored is written in the specified memory location in the main memory, and, at the same time, if a group of information including that stored in the specified memory location has been stored in the buffer memory, the information is rewritten.

A buffer memory having such a function as described above is used in order to decrease the access frequency to the main memory to a great extent and to make it possible to utilize the same information repetitively and immediately.

It is generally known that at this time an associative memory is used for addressing the buffer memory. The associative memory is addressed correspondingly to the buffer memory, and in the associative memory are stored the addresses in the main memory of the information stored in the buffer memory. When there occurs an access request, the address of the request and all the addresses stored in the associative memory are compared. Then, if there is an address in the associative memory which is in agreement with the requested address, the information in the buffer memory corresponding to the address in the associative memory is accessed.

When no information corresponding with the access request is stored in the buffer memory, the block including the requested information is read out from the main memory and transferred to any one of sectors in the buffer memory.

However, the conventional buffer memory cannot receive any other access requests until all information in the block including the requested information is transferred to the buffer memory. Therefore, the bandwidth of the buffer memory decreases and so the processing speed of the computer is lowered.

SUMMARY OF THE INVENTION

The present invention relates to a buffer memory control unit which is used in relation to a large capacity memory to decrease the frequency of the access request to this mass memory and which operates to store a given quantity of working information to make it possible to utilize the same information repetitively at a high speed during the information processing operation.

An object of the present invention is to provide an improved buffer memory control unit which enables other memory access requests to be made during block transfer.

DESCRIPTION OF THE PREFERRED EMBODIMENT

Figure 1:
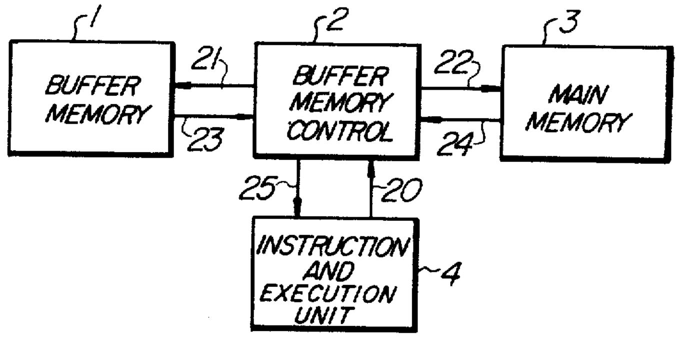
FIG. 1 is a block diagram of a processing unit according to the present invention.

In FIG. 1, a buffer memory control unit 2 is connected to a buffer memory 1 through connecting buses 21 and 23, to a main memory 3 through connecting buses 22 and 24 and to an instruction and execution unit 4 through connecting buses 20 and 25.

The instruction and execution unit 4 includes all the other components of a computer except for the buffer memory 1, the buffer memory control unit 2 and the main memory 3.

If an access request from the instruction and execution unit 4 is a read-out operation, the buffer memory control unit 2 decides whether the requested information is stored or not in the buffer memory 1 and provides this information to the execution unit 4 if it is stored therein.

If the requested information is not stored in the buffer memory, this information is read out from the main memory 3 to be provided to the execution unit 4 and at the same time to be transferred to the buffer memory 1.

When a read-out request for different information from the one under transfer is issued from the instruction unit 4 during transferring the information from the main memory 3 to the buffer memory 1, the buffer memory control unit 2 stops the transfer operation to the buffer memory 1 temporarily to perform the read-out operation therefrom earlier than the transfer. In a write-in operation, if the address of the appointed information is stored in the buffer memory 1, it is rewritten by using the buffer memory control unit 2 as the information from the instruction unit 4. At the same time, the rewritten information is also transferred into the main memory 3 to rewrite the information therein. When a write-in request for a different block from the one under block transfer is issued from the instruction unit 4 during the block transfer operation, the transfer operation is interrupted temporarily and the write-in operation into the buffer memory 1 and the main memory 3 is performed. Thereafter, the transfer operation starts again.

Figures 2A, 2B:
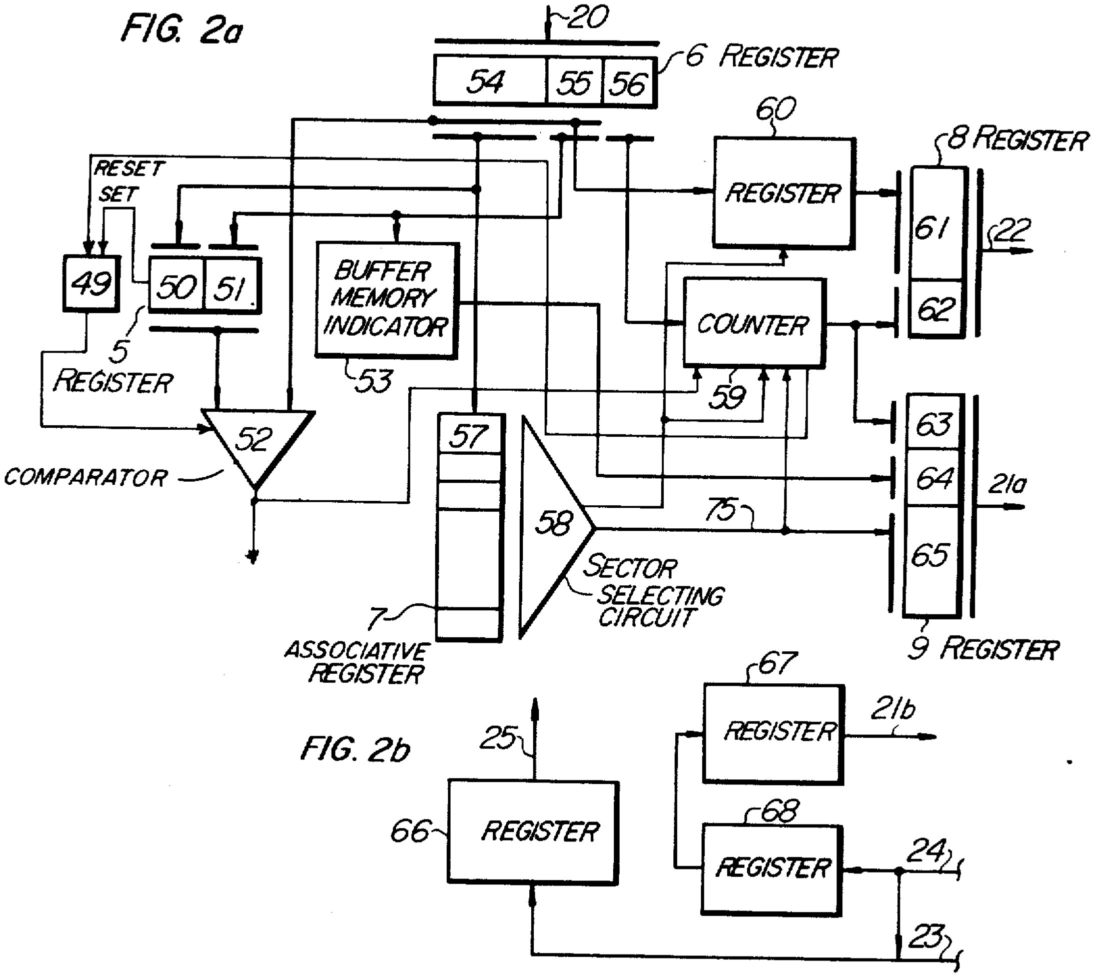
FIG. 2*a* is a block diagram of the buffer memory control unit in FIG. 1.
FIG. 2*b* is a block diagram for explaining the flow of information in the buffer memory control unit.

FIG. 2*a* shows one embodiment of the buffer memory control unit 2 according to the present invention.

An address register 6 comprises a higher-rank address register, that is, a sector register 54, a middle-rank address register, that is, a block register 55 and a lower-rank address register 56.

An associative register 7 (hereinafter referred to as ASR 7) is divided into a plurality of sections as indicated by reference numeral 57. The ASR 7 stores the sector addresses in the main memory 3 stored in the buffer memory 1. If the address in agreement with the sector address of the requested information set in the register 6 is set in the ASR 7, the address set in the ASR 7 is fed to a register 9 through a sector selecting circuit 58. The sector selecting circuit 58 is a mere well-known encoder which encodes the addresses of the ASR 7 storing the said address in agreement.

A buffer memory indicator 52 includes the block address stored in the buffer memory 1, and, when the block address is in agreement with the block address indicated by the block register 55 of the register 6, transfers the block address to the register 9. The buffer memory indicator 53 is one such as disclosed in the article by D. H. Gibson, "Considerations in Block-oriented Systems Design", S.J.C.C. (Spring Joint Conference on Computers), 1967, pages 75 to 80, or D. H. Gibson et al., "Structural Aspects of System 360/85," IBM Systems Journal, 1968, Vol. 7, No. 1, pages 2 to 29. Register 8 comprises a register 61 which receives information from a block a register 60 and register 62 which receives information from a counter 59 and is connected to the main memory 3 through the bus 22. A register 9 comprises a register 65 which receives information from the sector selecting circuit 58 selecting a sector address of the ASR 7, a register 64 which receives information from block register 55 and register 63 which receives information from the counter 59, and is connected to a buffer memory 1 through an address bus 21*a*. A register 5 comprises a higher-rank register 50 storing a sector address and a middle-rank register 51 storing a block address, and is connected to a comparator 52, and is also related to a register 49 indicating the presence of information in the register 5. Registers 66, 67 and in FIG. 2*b* are provided for the temporary storage of information.

When an access request occurs, the address is set in the address register 6. If the request is a read-out request, a sector whose address stored in the sector register 54 coincides with the address held by the ASR 7 is selected by the sector selecting circuit 58 and set in the register 65. At the same time, a block address in the block register 55 is transferred to a buffer memory indicator 53. If the requested block is stored in the buffer memory 1, it is transferred to the register 64. And, when the lower-rank register 63 is set, information is read out from the buffer memory 1 to the bus 25. If the requested sector address is not stored in the ASR 7, the contents of the sector address register 54 and block address register 55 are set in the block register 60. At the same time, the content of the lower-rank address register 56 is set in the counter 59 to access to the main memory 3 while stepping up the counter 59 one by one. The block including the requested information which is read out from the main memory 3 is set in the register 66 (FIG. 2*b*) and is fed to the execution unit 4 through the bus 25. At the same time, it is set in registers 68 and 67 and transferred to the buffer memory 1 through a data bus 21*b*. The bus 21 in FIG. 1 collectively represents the address bus 21*a* from the register 9 in FIG. 2*a* and the data bus 21*b* from the register 67 in FIG. 2*b*. When this block transfer operation begins, the read-out sector address and block address are stored in registers 50 and 51, respectively, and at the same time, an indicator representing the presence of information in the register 5 is set in the register 49. The register 49 is reset upon the completion of the block transfer operation. While the indicator is set in the register 49, the contents of the register 5 is always compared with the next requested sector address and block address to the buffer memory 1. When the next request to the buffer memory 1 is one for a block which is different from the block under transfer operation, that is to say, when the content of the register 5 does not coincide with the next requested sector address and block address in the comparator 52, the requested address is transferred to the buffer memory 1. Information read out from the buffer memory 1 is set in the register 66 to be supplied to the execution unit 4 through the bus 25. In this case, the counter 59 is kept stopped and a temporary stop signal is supplied to the main memory 3 to delay a read-out operation therefrom.

Figure 3:
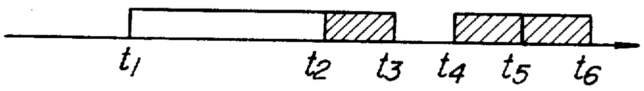
FIG. 3 is a time chart indicating an operating process in a block-transfer operation.

The block transfer operation from the main memory 3 to the buffer memory 1, is made according to such a time chart as shown in FIG. 3. Now, this process will be described in detail.

If it is found at a time $t_1$ that the requested information is not stored in the buffer memory 1, access to the main memory 3 begins and goes on until a time $t_2$. First information is obtained at the time $t_2$, and at the same time a block transfer into the buffer memory 1 begins. At a time $t_3$, a read-out request to the buffer memory 1 is issued from the instruction unit 4, the block transfer is interrupted temporarily and the read-out operation begins. At a time $t_4$, the read-out operation finishes, and the block transfer operation resumes and goes on till $t_5$ or $t_6$.

Figure 4:
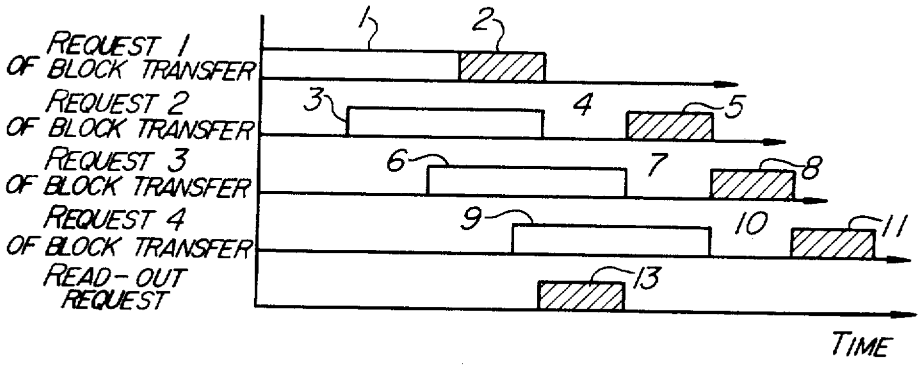
FIG. 4 is a time chart indicating the process in FIG. 3 in further detail.

FIG. 4 is a time chart indicating FIG. 3 in more detail. During a period 1, the first request for block transfer obtains access to the main memory 3 and during a period 2, the block operation to the buffer memory 1 is performed.

The second request gains access to the main memory 3 during a period 3 and the block transfer is going to be performed during a period 4. However, since a read request is being executed during this period 4 as indicated at an internal 13, the period 4 becomes a queuing period. During a period 5, the second word of block transfer is performed. The third request obtains access to the main memory 3 during a period 6, and since the block transfer for the request 2 is performed during the period 5; period 7 becomes a queuing period. Then, during the period 8, the third block transfer is performed. The fourth request is processed in the same manner as in the case of the request 3. The write-in operation is performed in much the same manner as the read-out operation. In FIG. 2*a*, the address stored in the address register 6 is compared with the sector address in the ASR 7 and if the requested information is in the buffer memory 1, it is written in the buffer memory 1, and if the requested information is not present in the buffer memory 1, it is written in the corresponding address of the main memory 3. At the same time, a block transfer to the buffer memory 1 is performed.

If an indicator of the register 49 is present when any other write-in request occurs during this block transfer operation, the counter 59 is temporarily stopped and the write-in operation is performed first, after which the block transfer is resumed.

As mentioned above, the comparator 52 decides whether the requested information is now included in the block under transfer or not, and if not, it stops the counter 59 and supplies a temporary stop signal to the main memory 3 to delay a read-in or write-in operation from or in the main memory. And, a read or write operation from or in the buffer memory is performed, thereby realizing a reduction of processing time in the computer.

What is claimed is:

1. A method of controlling a buffer memory when a read or write request is made to said buffer memory during the transfer of a block of information from a main memory to said buffer memory for information of another block which is different from said block under transfer and when the requested information is present in said buffer memory, comprising the steps of temporarily interrupting said transfer to perform the read or write operation from or in said buffer memory, and resuming said transfer after the completion of said read or write operation.

2. In an information processing system comprising a main memory, and a buffer memory having a shorter access time and a smaller number of memory locations than said memory: a buffer memory control system comprising a first register for storing the addresses of a sector and a block containing information being under transfer from said main memory to said buffer memory, a second register for indicating the presence or absence of information in said first register, a circuit for comparing the address of the sector and block requested during said transfer and said address of said sector and block under transfer, a counter which is interrupted when said addresses do not coincide with each other in said comparing circuit, and means for generating a temporary interruption signal to be supplied to said main memory synchronously with the interruption of said counter.

3. In an information processing system comprising a main memory, and a buffer memory having a shorter access time and a smaller number of memory locations than said main memory: a buffer memory control system comprising a register in which an address for reading or writing information is set, means for indicating whether or not the information of the address set in said register is present in said buffer memory, means for transferring a block including the information for which read-out is requested from said main memory to said buffer memory when said information is not present in said buffer memory, means for holding the address of the sector and block of the information transferred by said transfer means, means for comparing said address set in said register and said address held by said holding means during said block transfer by said transferring means, and means for interrupting said block transfer upon the provision of an incoincidence signal by said comparing means, for processing said request by the presence in said buffer memory of the information of said address set in said register, and for resuming said block transfer.

* * * * *